United States Patent [19]

Swartzendruber et al.

[11] Patent Number: 4,640,229

[45] Date of Patent: Feb. 3, 1987

[54] APPARATUS FOR FEEDING LIVESTOCK

[75] Inventors: Ray E. Swartzendruber, Syracuse; Keith Coffman, Leesburg, both of Ind.

[73] Assignee: Chore-Time Equipment, Inc., Milford, Ind.

[21] Appl. No.: 706,492

[22] Filed: Feb. 28, 1985

[51] Int. Cl.⁴ ............................................... A01K 5/02
[52] U.S. Cl. ............................... 119/51.11; 119/51.5; 119/52 AF
[58] Field of Search .................... 119/51.11, 71, 52 R, 119/51.5, 52 AF, 52 B

[56] References Cited

U.S. PATENT DOCUMENTS

| | | | |
|---|---|---|---|
| 3,205,860 | 9/1965 | Moore | 119/52 R |
| 3,359,947 | 0/1968 | Biehl | 119/51 |
| 3,386,418 | 0/1968 | Biehl | 119/51 |
| 3,524,432 | 8/1970 | Tartar | 119/71 X |
| 3,625,183 | 12/1971 | Tartar | 119/51.11 |
| 3,698,361 | 0/1971 | Lecce | 119/51.11 |
| 3,720,185 | 3/1973 | Aldous et al. | 119/51.11 |
| 3,722,475 | 3/1973 | Wittern et al. | 119/51.11 |
| 3,738,325 | 6/1973 | Wittern et al. | 119/18 |
| 4,291,647 | 9/1981 | Legrain | 119/71 |

Primary Examiner—Hugh R. Chamblee
Attorney, Agent, or Firm—Trexler, Bushnell & Wolters, Ltd.

[57] ABSTRACT

Apparatus for feeding livestock comprises a pan accessible to the livestock for feeding therefrom, a container for holding a quantity of feed comprising dry powdered feed material and a mixing chamber. A dispensing mechanism dispenses measured increments of the feed to the mixing chamber and a control valve is coupled with a water supply line for dispensing measured increments of water to the mixing chamber. A mixer is selectively operable for mixing the water with the feed to produce a fluid feed mixture for delivery into the pan.

14 Claims, 8 Drawing Figures

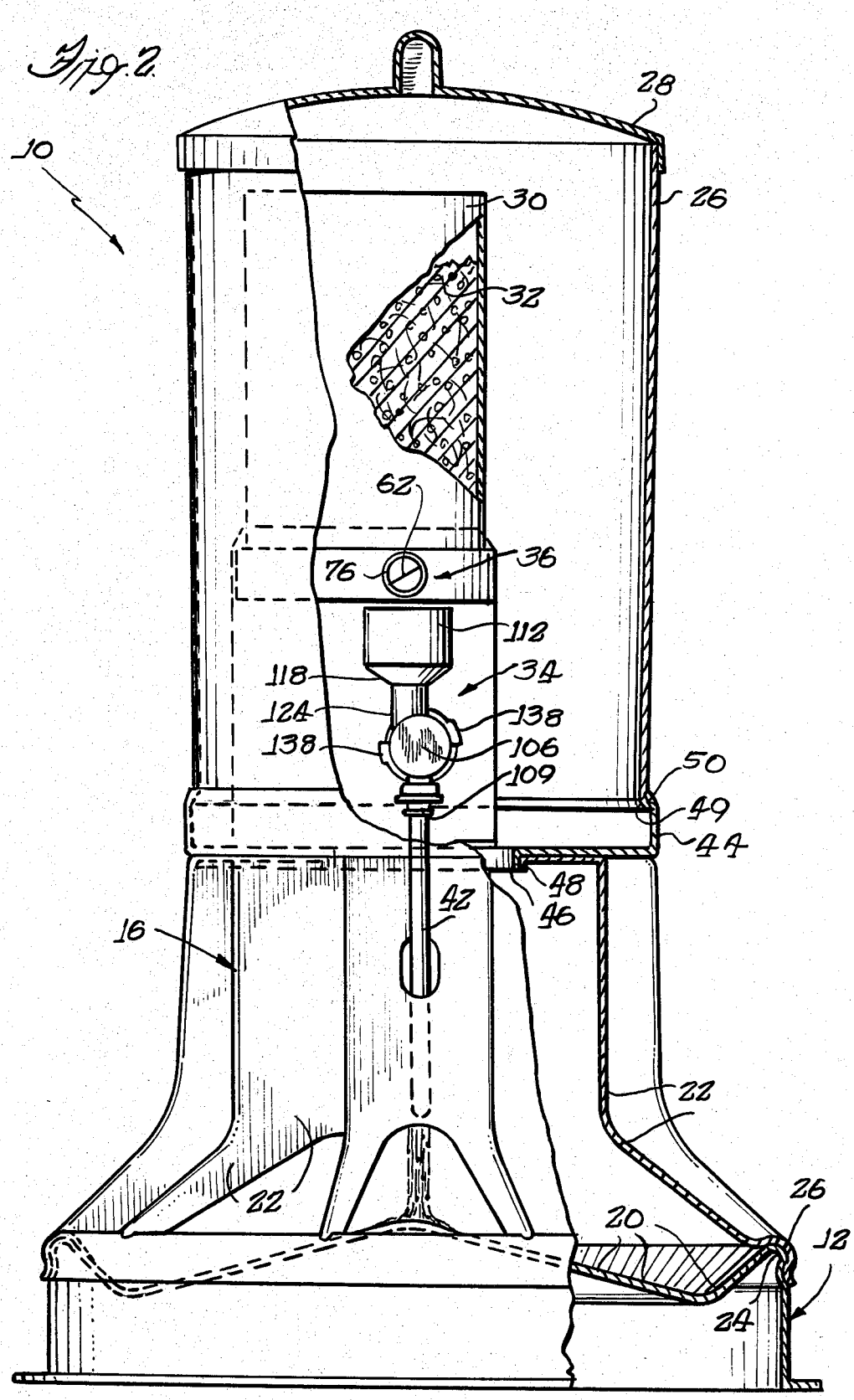

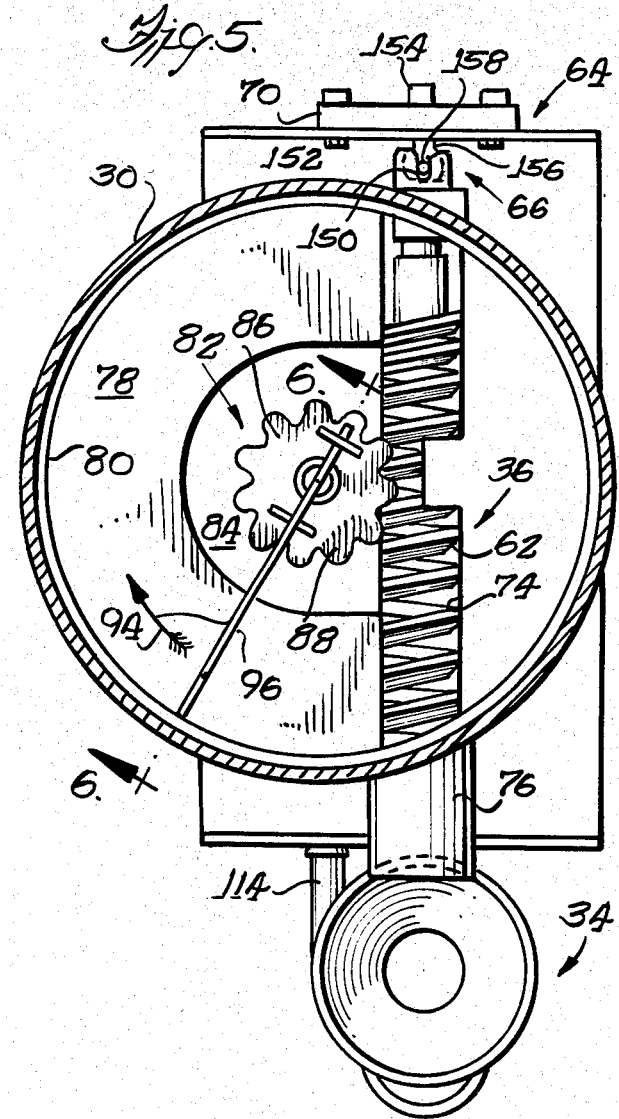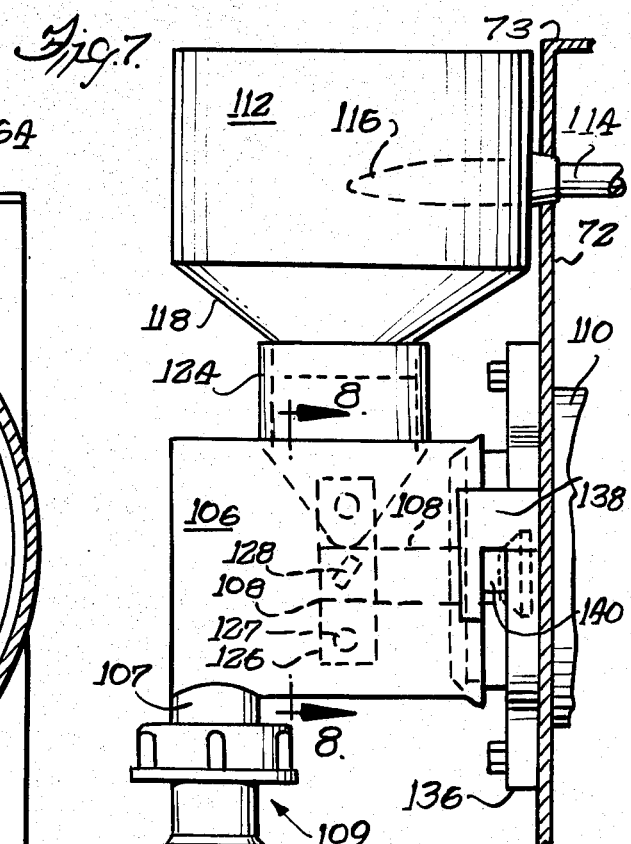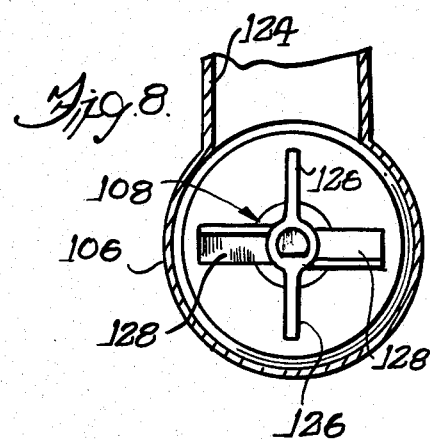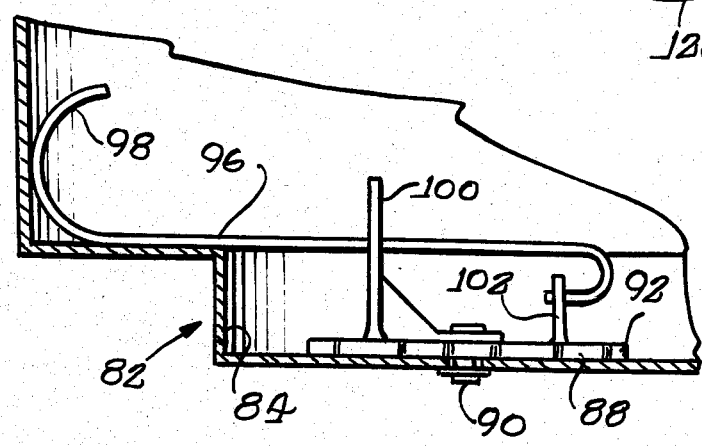

APPARATUS FOR FEEDING LIVESTOCK

BACKGROUND OF THE INVENTION

This invention relates generally to apparatus for feeding livestock and more particularly concerns a novel and improved apparatus for feeding young pigs.

In recent years, a number of systematic, scientific attempts have been made to raise hogs to fully adult size as rapidly as possible and with the minimum amount of feed. In this way, a maximum number of hogs may be produced over a given period of time with a minimum of feed and other expenses.

Modern methods call for specific quantities of feed and of water to be provided to the pigs at specific intervals of time. When using such preplanned methods of feeding and watering, it is helpful to provide water and feed delivery apparatus which can easily, inexpensively and quickly deliver the desired amounts of feed and water at the desired times. Moreover, such feeders are even more commercially attractive if they can be adjusted to vary the amounts of feed and water delivered and the times of their delivery for use in varying feeding situations. Moreover, these feeders should be of rugged construction and operate reliably for long periods of time with minimum maintenance. It is also important that the feeder delivery apparatus and feeder units be maintained relatively clean and free of feed debris or residue intermediate feeding periods so as to maintain the proper and desired conditions of cleanliness for raising pigs.

More specifically, a program has been devised for the feeding of baby pigs which have just been weaned, that is, pigs at least two weeks of age and usually at about 20 or 21 days and weighing in the neighborhood of ten pounds. The diet proposed is a liquid diet comprising a mixture of dry, powdered feed and water, the mixture being often referred to as "milk". As distinguished from some earlier methods wherein pigs were fed individually, this method contemplates feeding the baby pigs in groups, it being believed that group feeding as distinguished from individual feeding stimulates appetite and aggressive eating.

In the program which has been devised, the pigs are fed small amounts at regular intervals, and preferably at hourly intervals. The amount of food delivered at such intervals is related to the size of the pigs, such that as the pigs gain weight, the amount of food provided at these intervals is progressively increased. With this program, it has been found that the baby pigs will gain weight at an improved rate, often at more than one pound of weight for somewhat less than one pound of the dry, powdered feed material utilized in the program. Generally speaking, the pigs are maintained on this program for at least sixteen days and up to as much as about six weeks. Accordingly, it is desirable to provide feed delivery apparatus and feed units which can automatically carry out this program for feeding for baby pigs.

OBJECTS AND SUMMARY OF THE INVENTION

Accordingly, it is a general object of the invention to provide a novel and improved apparatus for feeding livestock.

A more specific object is to provide apparatus in accordance with the foregoing object which is adapted for automatically dispensing feed and water to the livestock at predetermined, desired intervals.

Yet a more specific object is to provide apparatus in accordance with the foregoing objects which is especially adapted for carrying out the feeding of pigs in accordance with the above-discussed program.

A related object is to provide a livestock feed apparatus which is capable of dispensing measured increments of dry feed and water and mixing together these increments of feed and water and thereafter dispensing the resulting fluid feed mixture into a feeding pan for consumption by the livestock.

A related object is to provide livestock feed apparatus including feeding units having contoured surfaces such that portions of the feeding units which come into contact with the feed are accessible to the livestock so that they will substantially lick these portions clean.

A related object is to provide feed delivery apparatus in accordance with the foregoing object wherein yet other surfaces of the feed delivery apparatus which are contacted by the liquid feed mixture during the feeding operation are periodically flushed with water to provide relatively clean and residue free surfaces thereof intermediate the feeding intervals.

Briefly, and in accordance with the foregoing objects, apparatus for feeding livestock comprises pan means accessible to the livestock for feeding therefrom; container means for holding a quantity of feed comprising dry powdered feed material; mixing means; feed dispensing means for dispensing measured increments of said feed to said mixing means; a water control valve for dispensing measured increments of water to said mixing means; said mixing means being selectively operable for mixing said water with said feed to produce a fluid feed mixture.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 2 is an enlarged side elevation, partially broken away and partially in section, illustrating further details of the apparatus of FIG. 1;

FIG. 5 is a partial top plan view illustrating further details of the apparatus of the invention;

FIG. 6 is an enlarged partial sectional view taken generally in the plain of the line 6—6 of FIG. 5 and illustrating further details thereof;

FIG. 7 is an enlarged partial side elevation, partially in section and illustrating further details of the apparatus of the invention; and FIG. 8 is a partial sectional view taken in the plane of the line 8—8 of FIG. 7.

DETAILED DESCRIPTION OF THE ILLUSTRATED EMBODIMENT

Figure 1:
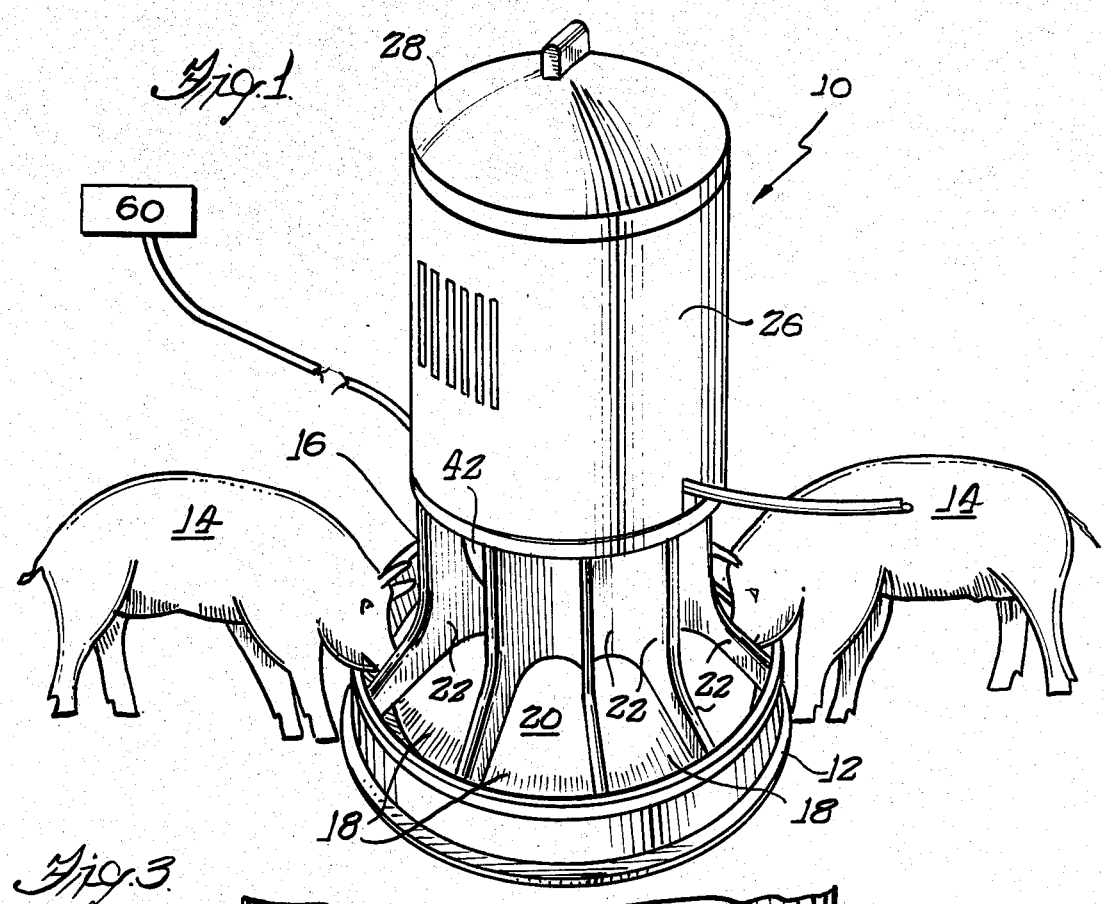
FIG. 1 is a perspective view illustrating apparatus for feeding livestock in accordance with the invention.

Referring now to the drawings and initially to FIGS. 1 and 2, apparatus for feeding livestock in accordance with the invention is designated generally by reference numeral 10. Generally speaking, the apparatus comprises a pan or pan means 12 accessible to livestock such as small pigs 14 for feeding therefrom. A divider means or structure 16 is also provided for defining a plurality of individual feeding stations 18 around the pan for individual pigs 14.

Advantageously in this regard, it will be noted that those surface portions of the feed pan 18 and of divider 16 which come into contact with the feed are contoured so as to be accessible to the livestock for substantially licking these portions clean of feed. Such contoured portions are indicated generally at reference numerals 20 with respect to pan 12 and 22 with respect to divider 16. As best seen in FIG. 2, the pan 12 and divider 16 are provided with complimentary interfitting peripheral lip portions 24, 25.

Remaining apparatus for delivering premeasured quantities of a feed mixture to the pan 12 are contained within a protective housing 26 which is preferably provided with a removable lid or cover 28. Beneath cover 28 is provided a container or container means 30 for holding a quantity of feed 32 preferably comprising a dry powdered feed material. Advantageously, a quantity of dry feed mix or material sufficient for a number of feedings may be introduced into the container 30, for example, enough feed for one day's feedings. Advantageously, by premeasuring the feed introduced into container 30 on a daily or other periodic basis in this fashion, records can be kept of the amount of feed utilized versus the rate of weight gain of the pigs 14 to assess feeding program efficiency. Variations may then be made in the feeding intervals provided or in the amount of feed dispensed during each feeding interval in order to optimize feeding program results, based upon such records. Moreover, providing powdered feed material in only such quantities as fill the container 30 assures relatively prompt consumption of the fed in container 30 and replacement thereof, thus assuring a relatively fresh supply of feed for the livestock.

Figure 3:
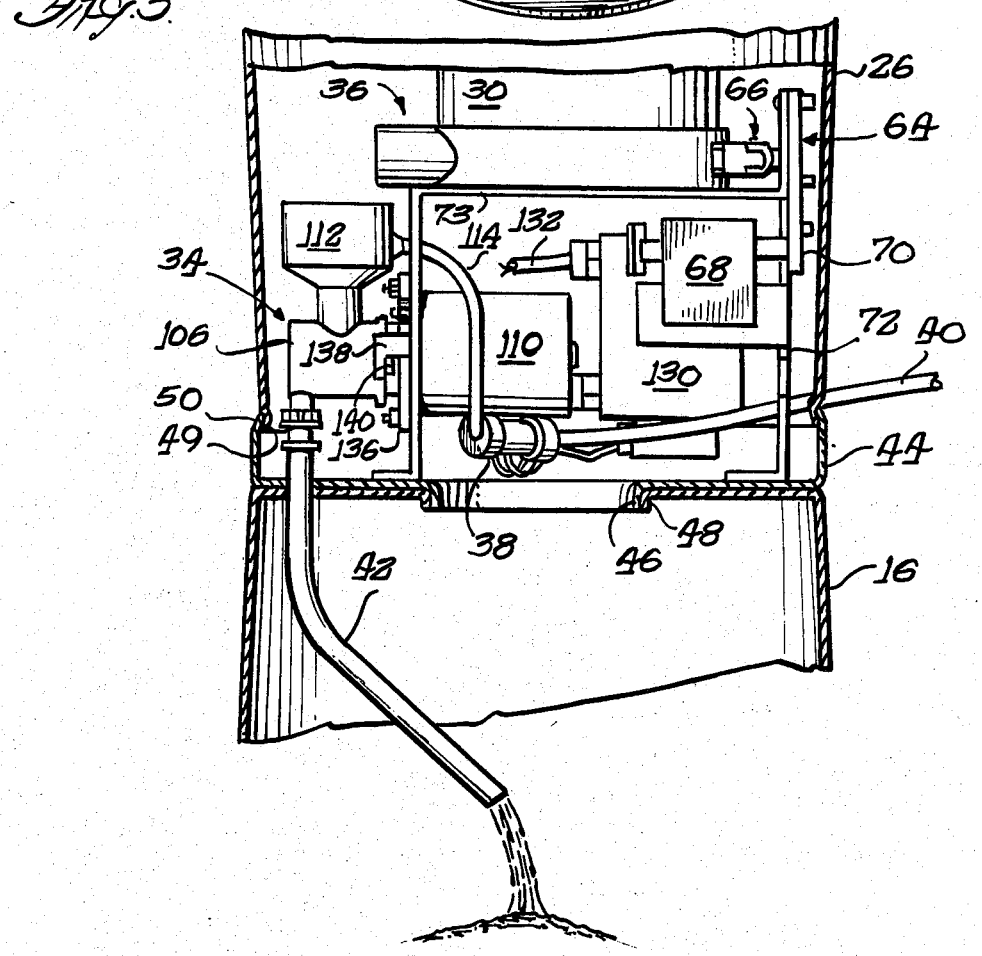
FIG. 3 is a further enlarged partial side elevation, also broken away to show further details of the apparatus of the invention.

Further in accordance with the invention, a novel mixing apparatus or mixing means designated generally by the reference numeral 34 is also provided. A feed dispensing structure or means designated generally by reference numeral 36 is provided for dispensing measured increments of feed from the container 30 to the mixing means 34. Additionally, control valve means in the form of a controllable valve member 38, best viewed in FIG. 3, is provided for delivering water from a water supply line 40 to the mixing means 34. The mixing means 34 is selectively operable, as will be further described presently, for mixing the water with the dry powered feed material to produce a fluid or liquid feed mixture or "milk". A suitable conduit means or delivery tube 42 is coupled with the mixing means 34 for delivering this fluid or liquid feed mixture from the mixing means into the pan 12.

As best viewed in FIGS. 2 and 3, the foregoing apparatus is preferably mounted upon a generally circular base member 44 which is in turn mounted to a top surface of divider 16. A pair of complementary interior projecting annular portions 46 and 48 formed centrally in the base 44 and divider 16, respectively, hold base 44 in place. Housing 26 is coupled with base 44 preferably by snapping engagement of a generally inwardly formed annular lower rim 48 thereof with a complementary generally inwardly formed annular upper rim 50 of base 44. Preferably, a novel controller or control means, diagrammatically illustrated at 60 in FIG. 1, is operatively coupled with the dispensing means 36 and the control valve means 38 for controlling the dispensing of the feed and water, respectively, in a predetermined, programmed fashion.

This controller 60 includes a timer or time clock, or alternatively a suitably programmed microcomputer or microprocessor means, for dispensing the feed and water at predetermined, desired time intervals. Preferably, the controller is programmed to dispense feed and water in accordance with the feeding programs discussed above, at regular intervals, and preferably at hourly intervals. Moreover, the microprocessor means is further programmed in accordance with this feeding program or regimen to progressively increase the amount of feed dispensed at successive ones of the feeding intervals, so as to generally keep pace with the weight gain and increased feed consumption of the pigs 14.

Additionally, for reasons which will be more fully appreciated later, the microprocessor or controller is preferably further programmed for continuing the dispensing of water for a predetermined time interval after each cessation of dispensing of feed. This is done in order to flush out remaining quantities of the dry or powdered feed material from the mixing means 34 and delivery conduit 42 intermediate feedings. This feature, together with the contoured feed pan and divider surfaces to be licked clean by the pigs as mentioned above, helps to maintain desired conditions of cleanliness in the pig raising operation.

Referring now to the remaining drawings and initially to FIG. 5, the dispensing means 36 will be seen to comprise a generally helical auger or auger means 62, and auger motor means 64 operatively coupled, as by a coupling 66, for rotating the auger 62. As best viewed in FIG. 3, the auger motor means 64 will be seen to comprise an electric motor 68 and a gear reduction assembly 70 coupled intermediate this motor 68 and coupling 66 for rotating the auger 62. The motor 68 and gear reduction assembly 70 are mounted to an upstanding frame member 72 which is in turn mounted to the base 44. This frame member 72 also defines a horizontal upper frame portion or platform 73 for mounting the container 30.

Further in this regard, the auger 62 is mounted or disposed within a generally elongate, and preferably semi-cylindrical trough or recess 74 formed in the bottom of container 30. A further tubular outlet member 76 generally forms a continuation of the trough or recess 74 and extends outwardly of a side of container 30. Hence trough 74 and outlet 76 together define a conduit for guiding feed as it is propelled from the container by the auger and into the mixing means or assembly 34.

As also best viewed in FIG. 5, the container 30 is generally circular in cross-section and defines a generally circular bottom surface 78 and a cylindrical interior sidewall or surface portion 80 adjacent to the bottom surface 78. Advantageously, a novel scraper assembly or scraper means 82 is also provided and disposed for traversing these bottom surface portions of container 30. This scraper serves to agitate the feed and also to direct the feed generally into the elongate recess or trough 74 to be carried outwardly of the container 30 by the auger 62.

Referring also to FIG. 6, the scraping means 82 comprises a generally circular recess 84 in the bottom of container 60 and a sprocket member 86 disposed in the recess 82 for rotation by the auger 62. In this regard, it will be seen that the sprocket 88 is rotatably mounted as generally indicated at 90 and has projecting teeth 92 engaged with the spirals of the auger 62 to thereby rotate the sprocket member 86 in the manner of a worm gear, in the direction indicated generally by arrow 94. A resilient, elongate scraping member 96 is also mounted to the sprocket member 88 for rotation in unison therewith. This elongate member 96 is preferably of a spring-like material and extends radially outwardly from the sprocket member. The scraping member 96 is dimensioned for scraping both the interior bottom surface 78 and adjacent interior sidewall surface 80 of the container 30. In this regard, elongate scraping member 96 is provided with a semi-circular radially outer and upwardly extending portion 98. A pair of projecting legs or mounting brackets 100 and 102 are provided for mounting scraping member 96 to the sprocket wheel 86.

Figure 4:
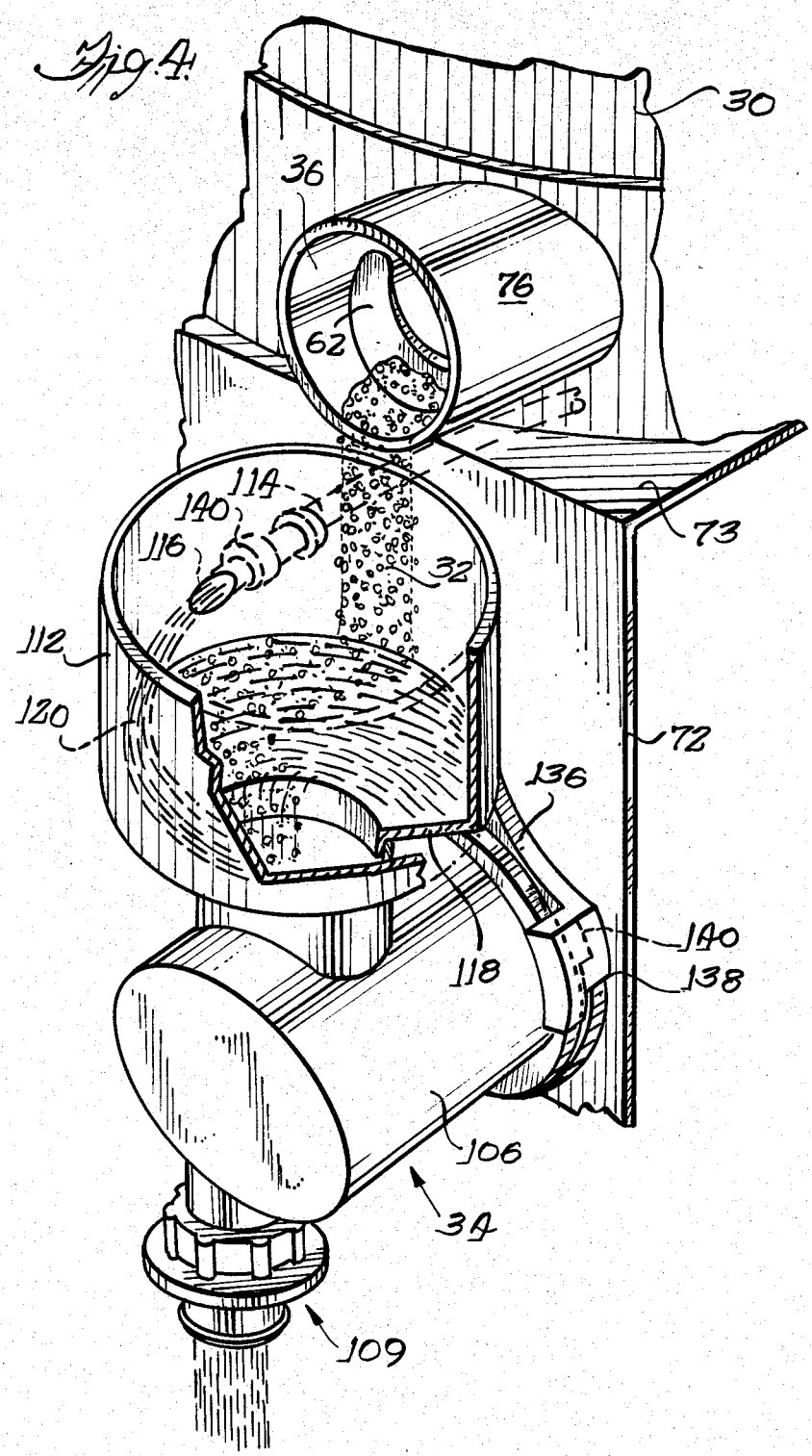
FIG. 4 is a further enlarged partial perspective view, partially broken away and illustrating further details of the apparatus of the invention.

As shown in FIGS. 4, 7 and 8, the mixing means or assembly 34 comprises a mixing chamber 106 and a mixing member 108 rotatably mounted in the chamber 106 for mixing the dry feed 32 with the water to form the fluid feed mixture or milk as previously described. A bottom outlet 107 of mixing chamber 106 is provided with a suitable fitting 109 for coupling with the tubular delivery conduit 42. A mixing motor means, preferably in the form of an electrical motor 110 as best viewed in FIG. 3 is provided for rotating the mixing member 108 within the mixing chamber 106. The mixing means 34 also includes a feeder cup means comprising a generally cylindrical, cup-like member 112 which is disposed or located for receiving the feed 32 from feed dispensing means 36 and specifically from the end of auger 62 through outlet conduit 76. This feeder cup also receives water from the control valve 38 by way of a conduit or tube 114 coupled to an opening 116 in a sidewall of cup 112.

The feeder cup 112 also includes a generally funnel-like bottom portion 118 in communication with the mixing chamber 106. The side opening 116 is preferably contoured for directing the water in a generally circumferential direction as generally indicated by reference 120. Hence, water is directed about the interior side surfaces of the cup-like member 112 and down the funnel-like portion 116 thereof so as to substantially wash the feed material 32 from the interior wall surfaces of the feeder cup 112 and into the mixing chamber 106. As best seen in FIG. 7, in the illustrated embodiment, a tubular upwardly directed extension or inlet member 124 of the mixing chamber 106 receives the funnel-like lower portion 118 of feeder cup 112.

As best viewed in FIGS. 7 and 8, the mixing member of the illustrated embodiment includes two pairs of generally orthogonally disposed impeller members or blades 126 and 128. The blades 126 preferably include through apertures 127 for agitating the feed and water. While the net flow is in the direction of outlet 107, the blades 128 are preferably tilted at an angle for driving the mixture generally away from the outlet 107 to attain good mixing of the feed and water.

As best viewed in FIG. 3, the mixing motor 110 is mounted to the upstanding frame member 72. Additionally, an electrical box 130 is provided for receiving an inlet control cable 132 from the controller 60 as well as an electrical power cord (not shown) from a suitable source of electrical power. This box 130 is wired for directing the flow of current for operation of the respective motors 68 and 110, and of the control valve 38 which is preferably an electrically operated valve, in response to control signals from controller 60.

As best viewed in FIGS. 4 and 7, the mixing means or assembly 34 is mounted to the frame member 72 by means of a mounting member or bracket 136. This mounting member or bracket 136 includes a pair of generally oppositely disposed outwardly projecting L-shaped mounting ears or locking means 138. In this regard, only the mounting ear 138 is seen in FIGS. 4 and 7, it being understood that a generally diametrically oppositely disposed and oppositely, that is upwardly, projecting locking ear 138 (see FIG. 2) is also formed on the mounting bracket 136. Cooperatively, a pair of outwardly projecting mounting tabs 140 are formed substantially 180 degrees apart at an outer peripheral end of the generally cylindrical mixing chamber 106. These tabs 140 interfit with L-shaped mounting ears 138 as generally indicated in FIGS. 4 and 7. That is, the mixing means or assembly 34 may be engaged with the mounting bracket 136 by aligning the mounting tabs 140 with respective mounting ears 138 and rotating the assembly 34 to secure engagement therebetween. Thereafter, feeder cup 112 may be inserted into fitting 124 and a suitable additional fitting 141 may be utilized to couple water tube or conduit 114 with inlet 116 of the feeder cup.

As best viewed in FIGS. 3 and 5, the coupling means or assembly 66 intermediate the reduction gear assembly 70 and auger 62 comprises a slotted sleeve member 150 which is coupled for rotation in unison with auger 62 and includes a plurality of axially running through slots 152 about its surface. These slots 152 extend to an open end 153 of the sleeve 150. Coupled for rotation in unison with an output drive shaft 154 of the reduction gear assembly 70 is a drive ball member which takes the form of a generally ball-like body 156 having a plurality of generally radially outwardly projecting lugs 158 which are located to interfit with one or more of the slots 152 of sleeve 150. This configuration of the interfitting drive assembly 66 permits simple and rapid removal of the container 30, with the feed delivery structure 62 and scraping assembly 82 assembled therewith for cleaning, replacement, repair or the like. Since the drive coupling assembly 66 involves no permanent connections, fasteners or the like, it may be readily assembled and disassembled in this fashion to permit rapid removal of container 30 and the above mentioned components carried therein as may be required or desired to facilitate frequent cleaning. This facilitates the maintenance of proper conditions of cleanliness in the pig-raising operation.

While particular embodiments of the invention have been shown and described in detail, it will be obvious to those skilled in the art that changes and modifications of the present invention, in its various aspects may be made without departing from the invention in its broader aspects, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. Apparatus for feeding livestock comprising: pan means accessible to the livestock for feeding therefrom; container means having a bottom and sides for holding a quantity of feed comprising dry powdered feed material; mixing means; feed dispensing means for dispensing measured increments of said feed to said mixing means; control valve means for dispensing measured increments of water to said mixing means; said mixing means being selectively operable for mixing said water with said feed to produce a fluid feed mixture; wherein said feed dispensing means comprises auger means and auger motor means operatively coupled for rotating said auger means; and further including an elongate recess extending below said bottom of said container means for mounting said auger means therein; said auger recess having an outlet at one end thereof and extending across said bottom of the container means to said outlet and being generally of semicylindrical cross-section and open-topped for mounting the auger recessed below but in communication with said container means for receiving feed therefrom and carrying said feed outwardly thereof; wherein said container is substantially circular in cross-section defining a generally circular bottom and generally cylindrical sidewall portion adjacent thereto and further including scraping means disposed for traversing a bottom portion of said container for agitating said feed and directing said feed generally into said elongate recess to be carried outwardly of said container by said auger; and wherein said scraping means comprises a generally cylindrical, open-topped recess extending below said container means bottom and in communication with at least a portion of said elongate recess, a sprocket member configured, and disposed in said circular recess, for rotation by said auger, and a resilient elongate member mounted for rotation with said sprocket member and extending radially outwardly therefrom, and dimensioned for scraping a substantial portion of the interior bottom surface and an adjacent portion of an interior sidewall surface of said container means.

2. Apparatus according to claim 1 and further including conduit means coupled with said mixing means for delivering said fluid feed mixture from the mixing means into said pan means.

3. Apparatus according to claim 1 and further including a tubular member extending from a side of said container and in communication with said outlet of said auger-mounting recess to together define a conduit for guiding said feed as it is propelled from said container means by said auger means and to said mixing means.

4. Apparatus according to claim 1 wherein said mixing means comprises a mixing chamber, a mixing member rotatably disposed in said mixing chamber and mixing motor means operatively coupled for rotating said mixing member.

5. Apparatus according to claim 4 wherein said mixing means further includes feeder cup means disposed for receiving said feed from said feed dispensing means and said water from said control valve means and for delivering said feed and water to said mixing chamber.

6. Apparatus according to claim 5 wherein said feeder cup means comprises a substantially cylindrical cup-like member having a funnel-like bottom portion in communication with said mixing chamber and a side opening therein contoured for directing said water in a generally circumferential direction about interior surfaces of said cup-like member so as to wash said feed from said interior surfaces thereof and into said mixing chamber.

7. Apparatus according to claim 6 and further including water conduit means interposed intermediate said valve means and said contoured side opening in said feeder cup.

8. Apparatus according to claim 1 wherein said pan means comprises a feeding pan and divider means arranged for defining a plurality of feeding stations around said feeding pan.

9. Apparatus according to claim 8 wherein those portions of said feeding pan and said dividers which come into contact with said fluid feed mixture are contoured so as to be accessible to the livestock for substantially licking said portions clean of said mixture.

10. Apparatus according to claim 1 and further including control means operatively coupled with said dispensing means and with said valve means for controlling the dispensing of said feed and water respectively in a predetermined fashion.

11. Apparatus according to claim 10 wherein said control means comprises microprocessor means programmed for dispensing feed and water at predetermined, desired time intervals.

12. Apparatus according to claim 11 wherein said microprocessor means is further programmed for actuating said feed dispensing means for increasing the amount of feed dispensed thereby at successive ones of said predetermined desired time intervals.

13. Apparatus according to claim 11 wherein said microprocessor means is further programmed for dispensing said water for a predetermined time interval after the cessation of dispensing of said feed for flushing out said mixing means.

14. Apparatus for feeding livestock comprising: pan means accessible to the livestock for feeding therefrom; container means having a bottom and sides for holding a quantity of feed comprising dry powdered feed material; mixing means; feed dispensing means for dispensing measured increments of said feed to said mixing means; control valve means for dispensing measured increments of water to said mixing means; said mixing means being selectively operable for mixing said water with said feed to produce a fluid feed mixture; wherein said feed dispensing means comprises auger means and auger motor means operatively coupled for rotating said auger means; and further including an elongate recess extending below said bottom of said container means for mounting said auger means therein; said auger recess having an outlet at one end thereof and extending across said bottom of the container means to said outlet and being generally of semicylindrical cross-section and open-topped for mounting the auger recessed below but in communication with said container means for receiving feed therefrom and carrying said feed outwardly thereof; and further including coupling means for releasably coupling said motor means for rotating said auger means; said coupling means being releasable for permitting removal of said container and said feed dispensing means from the apparatus as a unit; and wherein said coupling means comprise an open-ended sleeve member coupled with said auger means for rotation in unison therewith and having a plurality of axially running through slots extending to the open end thereof, and a drive ball operatively coupled for rotation by said motor and having a plurality of radially outwardly projecting lugs for interfitting with at least selected ones of said slots.

* * * * *